United States Patent [19]

Christensen

[11] Patent Number: 5,397,923
[45] Date of Patent: Mar. 14, 1995

[54] DEVICE FOR REMOTE CONTROL USING WAVE ENERGY

[76] Inventor: Mark Christensen, 20 Wakonda, Trabuco Canyon, Calif. 92679

[21] Appl. No.: 82,597

[22] Filed: Jun. 25, 1993

[51] Int. Cl.$^6$ ............................................. H04Q 9/14
[52] U.S. Cl. ...................................... 307/9.1; 307/10.1
[58] Field of Search .................... 340/932.2, 933, 942, 340/943, 483, 988, 480; 180/167–168; 341/176; 455/99; 250/205; 307/9.1, 10.1, 139, 154

[56] References Cited

U.S. PATENT DOCUMENTS

| | | | |
|---|---|---|---|
| 2,588,879 | 3/1952 | Richards | 268/59 |
| 3,936,833 | 2/1976 | Bush | 343/225 |
| 4,241,870 | 12/1980 | Marcus | 296/37.7 |
| 4,247,850 | 1/1981 | Marcus | 340/694 |
| 4,286,262 | 8/1981 | Wahl | 340/694 |
| 4,549,178 | 10/1985 | Lester | 340/825.58 |
| 4,731,605 | 3/1988 | Nixon | 340/696 |
| 4,847,601 | 7/1989 | Conti | 341/176 |
| 5,020,845 | 6/1991 | Falcoff et al. | 296/37.7 |
| 5,064,974 | 11/1991 | Vigneau et al. | 200/61.62 |
| 5,208,586 | 5/1993 | Friberg et al. | 340/932.2 |

*Primary Examiner*—A. D. Pellinen
*Assistant Examiner*—Aditya Krishnan

[57] ABSTRACT

A device for providing remote control current signals to wave energy transmitters in a vehicle is provided. The vehicle has a power source, a manually operated electrical switch, and at least one wave energy transmitter. The device comprises an electrical network including a first timing R—C circuit, a second timing R—C circuit, a counter, and a transmission actuator that has a plurality of transmission output lines. The first timing R—C circuit provides a first timing period triggered by a first actuation of the electrical switch in the vehicle. The counter counts the number of times the electrical switch is actuated during the timing period. The transmission actuator provides an output current to one of the output lines for a duration controlled by the second timing R—C circuit. Selection of the output line for receiving the output current is determined by the accumulated count during the first timing period. Each wave energy transmitter is arranged so that receiving the output current on the output line closes a switch in the transmitter, which consequently produces the desired burst of wave energy. A voltage regulator may be included for modifying the vehicle battery voltage so as to be compatible with each wave energy transmitter. A signal conditioner may be included for reducing alternating current components in the direct current voltage input to the counter so that false triggering of the counter is prevented.

7 Claims, 3 Drawing Sheets

DEVICE FOR REMOTE CONTROL USING WAVE ENERGY

FIELD OF THE INVENTION

This invention relates generally to electronic switches, and, more particularly, is directed towards an electronic device for providing remote control current signals for actuating wave energy transmitters.

BACKGROUND OF THE INVENTION

It is known that conventional garage door opener transmitters, which are typically clipped onto a sun visor or otherwise placed in a convenient location, have considerable drawbacks. For example, since such transmitters are conspicuous, they are prone to theft, tampering by children, and the like. Such transmitters are easily misplaced when removed from the vehicle. Further, such transmitters require batteries which must be replaced periodically.

Several prior art devices exist to overcome these drawbacks. For example, U.S. Pat. No. 4,847,601 to Conti on Jul. 11, 1989, teaches a conversion kit for placing the transmitter, more or less fixed in place, at a remote location in the vehicle out of sight. The transmitter is powered with a stepped-down voltage from the vehicle battery, and actuated with a remote switch installed on or near the dash. U.S. Pat. No. 4,731,605 to Nixon on Mar. 15, 1988, discloses a similar invention. While such prior art devices are perhaps well suited for use with one transmitter, such devices do not make provision for multiple transmitters in one vehicle. Many homes have two or three-car garages with multiple garage doors, each door having a separate garage door opener and therefore separate garage door opener transmitters. Further, many gated communities require an additional transmitter to open an automatically controlled community gate. As such, it is not uncommon to find a single vehicle with two, three, or more separate transmitters, each transmitter for operating a separate gate or garage door. The prior art devices are clearly impractical in such situations, since one such prior art device is required for each transmitter. Moreover, this results in multiple additional switches installed in the passenger compartment.

A further drawback of such prior art devices is that most vehicle dashboards suffer from an overabundance of switches, knobs, and actuators in the first place. Adding an additional switch for each transmitter only serves to increase the overall complexity of operating the vehicle and further clutters the dashboard. Moreover, the installation of even one such switch must typically be performed by someone skilled with electronic vehicle installations, since not everyone can install a switch in a dashboard with professional results. As a result, while the manufacturing costs of such prior art devices may not be considerable, the cost of installing such prior art devices tends to be relatively high.

Still another drawback of the prior art devices, and conventional transmitter devices as well, is that the transmitter of such devices only transmits while one depresses the switch, which is typically a momentary normally-open push button type of switch. Frequently, however, people misjudge the length of transmission time required to operate the desired door or gate. As a result, many times a person will depress the switch for too brief a period of time, and the desired door or gate will not open. A second or third attempt is then required until one sees for a fact that the door or gate opener has been activated.

Clearly, then, there is a need for a device that allows remote actuation of a plurality of wave-energy transmitters. Such a needed device would be relatively inexpensive both to manufacture and to install, and would not require the installation of any additional switches in the vehicle dashboard, or the like. Further, such a needed device would have the added benefits of being powered from the vehicle battery, eliminating the need for separate batteries for each transmitter. Still further, such a needed device would keep such transmitters out of casual sight, and considerably reduce the chance of theft, tampering, or the like. Such a needed device would also control the transmission time of the transmitters, thereby ensuring that the transmission duration is long enough to activate the door or gate opener. The present invention fulfills these needs and provides further related advantages.

SUMMARY OF THE INVENTION

The present invention is a device for providing remote control current signals to separate wave energy transmitters in a vehicle. The vehicle has a battery, a manually operated electrical switch such as that of a high-beam headlight control lever, and at least one wave energy transmitter. The device comprises an electrical network including a timer, a counter, and a transmission actuator that has a plurality of transmission output lines. The timer provides a first timing period triggered by a first actuation of the electrical switch in the vehicle. The counter counts the number of times the electrical switch is actuated during the first timing period. The transmission actuator provides an output current to one of the output lines for a duration controlled by a second timing period. Selection of the output line for receiving the output current is determined by the accumulated count during the first timing period. Each wave energy transmitter is arranged so that receiving the output current on the output line closes a switch in the transmitter, which consequently produces the desired burst of wave energy for the second timing period. A voltage regulator may be included for modifying the vehicle battery voltage so as to be compatible with each wave energy transmitter. Further, a signal conditioner may be included for reducing alternating current components in the direct current voltage input to the counter so that false triggering of the counter is prevented. The present device may be contained in a rigid, water proof enclosure and installed in the engine compartment of the vehicle. The present device requires that only three wires be connected to the electrical system of the vehicle, namely, +12 volts, ground, and a trigger wire connected to the high-beam switch wire or to another pre-existing dashboard switch wire.

The present invention allows separate, remote actuation of a plurality of wave-energy transmitters with a single pre-existing dashboard switch. The present device is relatively inexpensive both to manufacture and to install, as it does not require the installation of any additional switches in the vehicle dashboard or passenger compartment. Further, the present device has the added benefit of being powered from the vehicle battery, eliminating the need for separate batteries for each transmitter. Still further, the present invention keeps each transmitter out of casual sight, thereby considerably reducing the chances of theft of the device, tampering, or the like. Moreover, the present device also controls the transmission time of each transmitter, thereby ensuring that the transmission duration is long enough to be effective. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
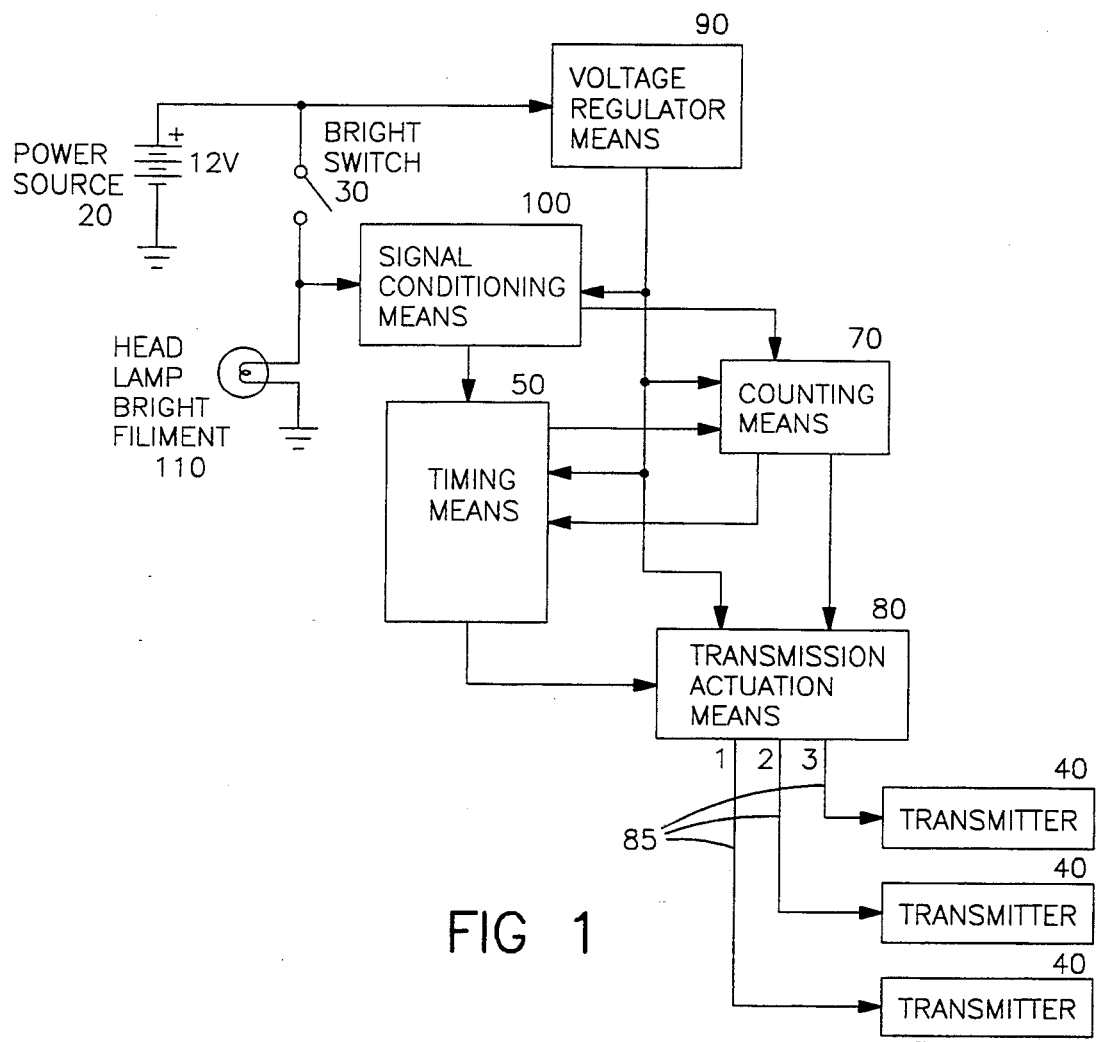
FIG. 1 is a schematic block diagram of the invention.
Figure 2B:
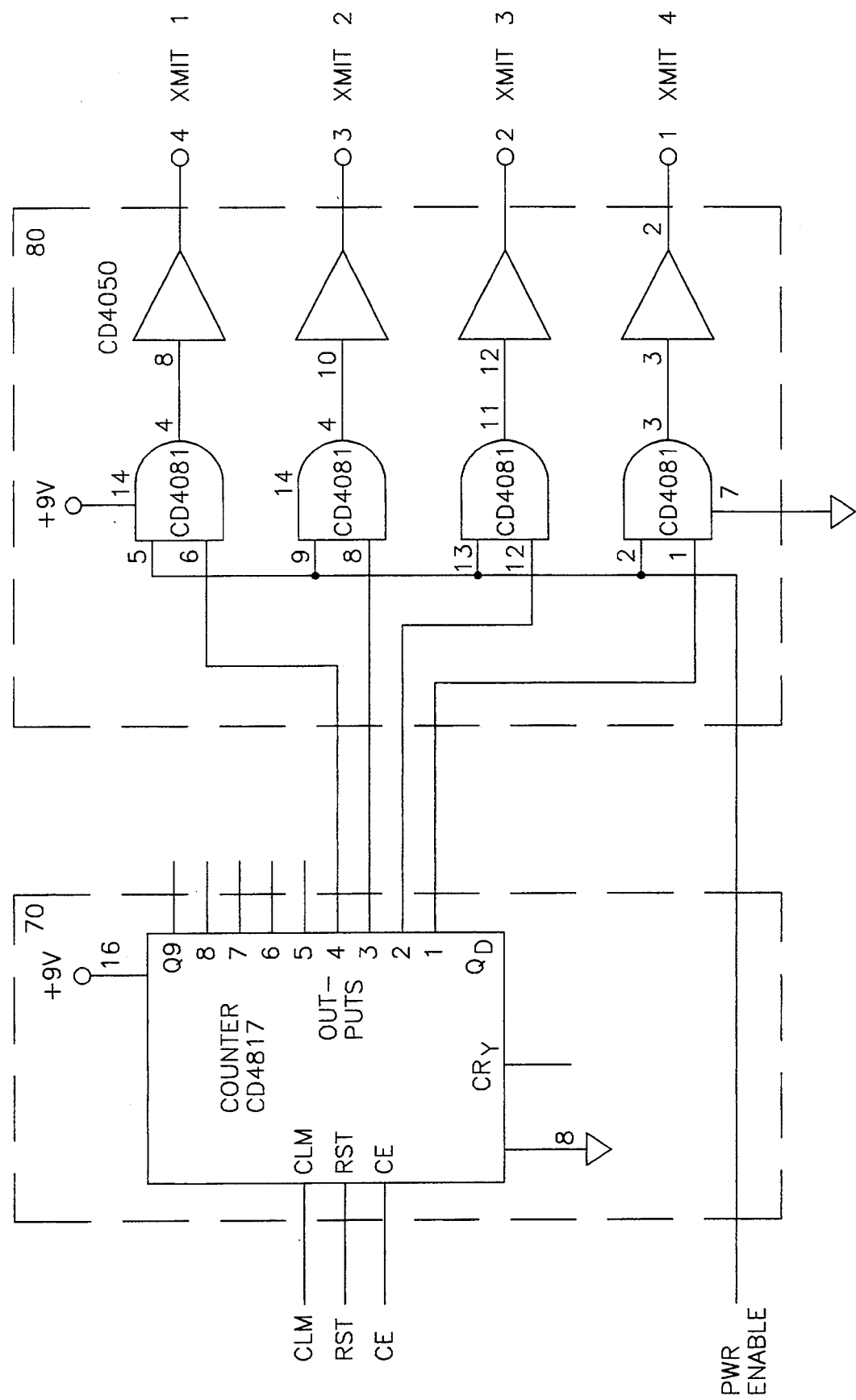
FIG. 2B is a partial schematic diagram of the preferred embodiment of the invention, illustrating a counting means and a transmission actuation means of the invention.
Figure 2A:
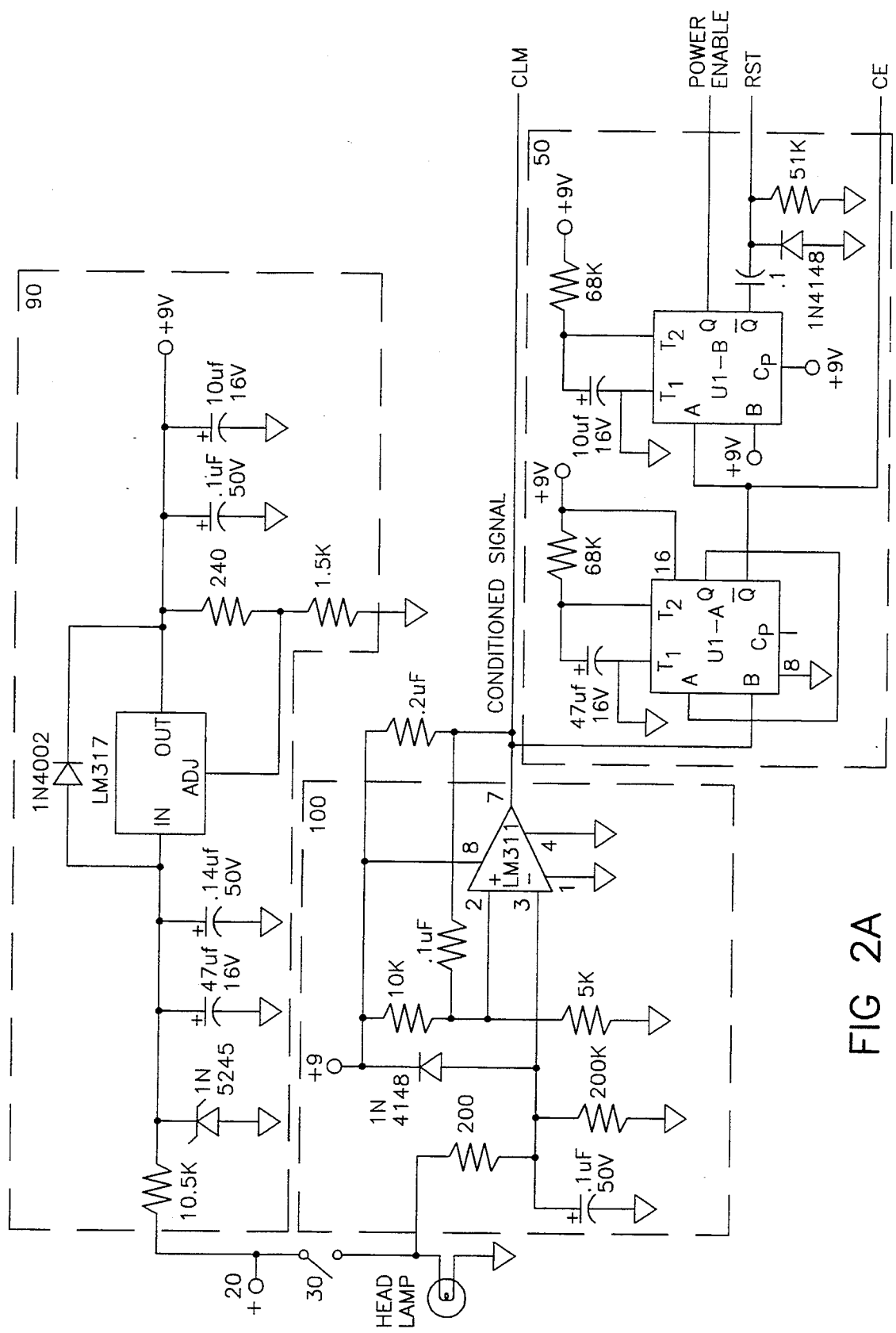
FIG. 2A is a partial schematic diagram of the preferred embodiment of the invention, illustrating a timing means, an electronic switch, a voltage regulating means, and a signal conditioning means of the invention.

FIG. 1 illustrates a device for providing remote control signals in a vehicle. The vehicle has a power source 20, a manually operated electrical switch 30, and at least one wave energy transmitter 40. In the simplest embodiment, the device comprises an electrical network including a timing means 50 that provides a first timing period and a second timing period, a counting means 70, and a transmission actuation means 80 including a plurality of transmission output lines 85. In the preferred embodiment, as shown in FIGS. 2A and 2B, the timing means 50 consists of solid state timers such as flip-flops or one-shots with appropriate biasing components. Alternatively the use of a single VLSI timing chip could be employed. The main concern is that components which are readily available, inexpensive, ruggedized and temperature insensitive should be used.

The counting means 70 might be a CD4017 counter circuit or similar device. The counter enables one of a set of similar output lines, in this case through AND logic elements, wherein both the counter means 70 input as well as the input from the timing means 50 must be high or "on" for the appropriate output circuit to be energized. Buffer elements, CD4050, are used for boosting output current from less than one milliamp to about the level of 10 milliamps required for typical application transmitters 40. Each transmitter 40 may be built into the circuit board of the invention (not shown), or may be added in the field assuming that the device provides, in such an embodiment, suitable mechanical and electrical interface means (not shown).

The first timing period of the timing means 50 is triggered by a first actuation of the electrical switch 30 in the vehicle. The counting means 70 counts the number of times the electrical switch 30 is actuated during the first timing period, typically 2 seconds duration. The transmission actuation means 80 provides an output current to one of the output lines 85 for a duration controlled by the second timing period. Selection of the output line 85 for receiving the output current is determined by the accumulated count during the first timing period, typically between ½ to 1 second. Each wave energy transmitter 40 is arranged so that receiving the output current on the output line 85 doses a switch therein for producing the burst of wave energy.

A voltage regulating means 90 may be included for reducing the direct current input voltage from the power source 20 to a selected level so that voltage compatibility is attained with the wave energy transmitters 40. For example, many vehicle power sources 20 operate at 12 volts DC, and many wave energy transmitters 40 operate at 9 volts DC. In such a case, the voltage regulating means 90 converts the vehicle 12 volt DC source 20 to a selected level of 9 volts DC. In the preferred embodiment, this voltage adjustment is accomplished using an LM317 circuit with an appropriate voltage division control resistor. Further, a signal conditioning means 100 may be included for reducing voltage transients such as are produced during mechanical switching. False triggering of the counting means 70 is thereby eliminated. An LM311 comparitor circuit is preferably employed, as shown in FIG. 2B, to accomplish this.

The device may be contained in a rigid, water-proof enclosure (not shown) for installation in the engine compartment of the vehicle, or the like. The device may be electrically installed into the vehicle by simply connecting three wires to the vehicle's electric system, namely, +12 volts, ground, and a trigger wire tied into the 12 volt side of the electrical switch 30, such as a high-beam or other switch.

Figure 3:
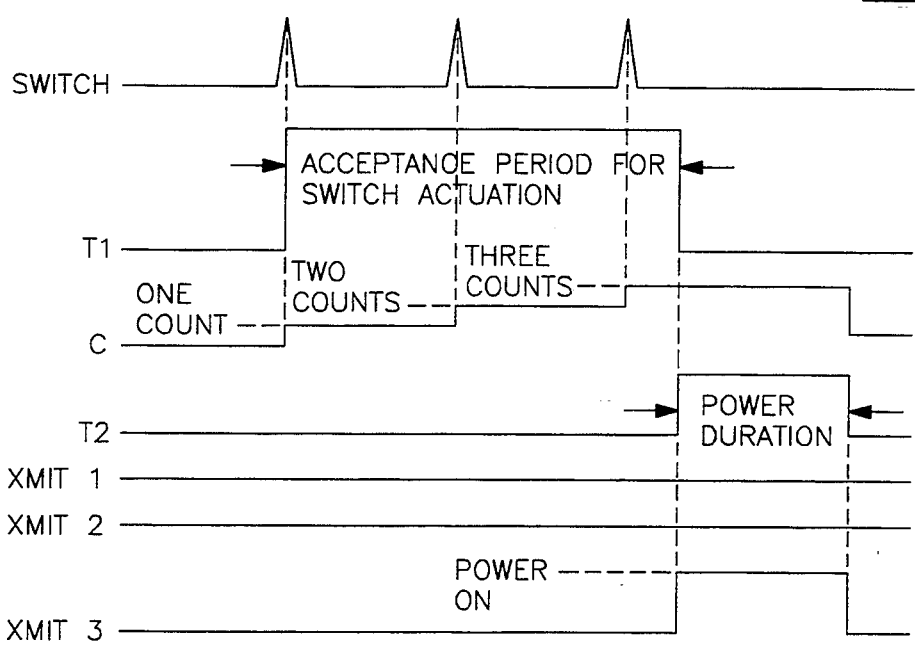
FIG. 3 is a timing diagram of the output signals for the electrical switch of the vehicle, a first timing period, the counting means, a second timing period, a first transmitter, a second transmitter, and a third transmitter of the invention.

FIG. 3 is a timing diagram illustrating the device in use. The electrical switch 30 is actuated a number of times, for example three, corresponding to the desired wave energy transmitter 40. The signal processing means 100 smooths or conditions the signal from the electrical switch 30 for input to the counting means 70 and the timing means 50. Upon the first actuation of the switch 30, the timing means 50 begins a first timing period. The counting means 70 counts the number of actuations of the switch 30 which occur during the first timing period. When the first timing period expires, the timing means 50 signals the counting means 70 which in turn signals the transmission actuation means 80, said signal representing the number of separate actuations of the switch 30 that occurred within the first time period. The transmission actuation means 80 then provides an output current to the corresponding transmission output line 85 for a duration controlled by the second timing period, whereby the output current is delivered to the appropriate one of the wave energy transmitters 40 to provide a wave energy burst as a desired remote control signal, and the counting means 70 is reset to zero. As such, a vehicle operator may actuate the electrical switch 30, for example, three times in relatively short succession, whereby the wave energy transmitter 40 on the third transmission output line 85 will be actuated.

While the invention has been described with reference to a preferred embodiment, it is to be clearly understood by those skilled in the art that the invention is not limited thereto. Rather, the scope of the invention is to be interpreted only in conjunction with the appended claims.

I claim:

1. A device for providing remote control signals from a vehicle, the vehicle having a manually operated electrical switch and at least one wave energy transmitter supported by said vehicle, the device comprising:

an electrical network including timing means, counting means, and transmission actuation means having a plurality of transmission output lines;

the timing means for providing a first timing period triggered by a first actuation of the manual electrical switch in the vehicle, the counting means for counting the number of times the manual electrical switch is actuated during the timing period, the transmission actuation means for selecting one of the plurality of output lines determined by the number of times the manual electrical switch is actuated during the first timing period and for providing an output signal to one of the output lines for a duration controlled by a second timing period whereby the output signal is delivered to one of the at least one wave energy transmitters to provide a wave energy remote control signal from the vehicle.

2. The device for providing remote control current signals from a vehicle of claim 1 further including voltage regulating means, connected to said electrical network for reducing a direct current input voltage to a selected level of output voltage to assure voltage compatibility.

3. The device for providing remote control current signals from a vehicle as recited in claim 1 and further comprising signal conditioning means having means for reducing alternating current components in the direct current voltage to reduce the possibility of false triggering.

4. A device for providing remote control signals from a vehicle with a manually operated electrical switch, and at least one wave energy transmitter, the device comprising:

an electrical network including interconnected timing means, counting means, and transmission actuation means having a plurality of transmission output lines, each said one of the lines being electrically compatible with one of the at least one wave energy transmitters;

the timing means for producing a first timing period triggered by a first actuation of the manually operated electrical switch in the vehicle, the counting means for counting the number of times the electrical switch is actuated during the timing period, the transmission actuation means for providing an output current to one of the output lines for a duration controlled by a second timing period, and for selecting of the one of the output lines for receiving the output current based upon an accumulated manually operated electrical switch closure count occurring during the first timing period;

whereby the output current is delivered to one of the at least one wave energy transmitters to provide a wave energy burst.

5. The device for providing remote control current signals from a vehicle as recited in claim 5 and further including voltage regulating means, connected to said electrical network for reducing a direct current input voltage to a selected level of output voltage.

6. The device for providing remote control current signals from a vehicle as recited in claim 4 and further comprising signal conditioning means having means for reducing alternating current components in the direct current voltage to reduce the possibility of false triggering.

7. The device for providing remote control current signals from a vehicle as recited in claim 1 wherein said electrical network also includes said at least one wave energy transmitter.

* * * * *